us010229448B2

United States Patent
Ahuja (10) Patent No.: US 10,229,448 B2
(45) Date of Patent: Mar. 12, 2019

(54) NETWORK OF PERSONALIZED DEVICES DETERMINING DATA FOR SHOPPING PREDICTIONS

(71) Applicant: PAYPAL, INC., San Jose, CA (US)

(72) Inventor: Sumeet Ahuja, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 508 days.

(21) Appl. No.: 14/971,593

(22) Filed: Dec. 16, 2015

(65) Prior Publication Data

US 2017/0178217 A1 Jun. 22, 2017

(51) Int. Cl.
  *G06Q 30/00* (2012.01)
  *G06Q 30/06* (2012.01)
  *H04W 4/02* (2018.01)
  *H04W 4/21* (2018.01)

(52) U.S. Cl.
  CPC ..... *G06Q 30/0631* (2013.01); *G06Q 30/0607* (2013.01); *G06Q 30/0611* (2013.01); *H04W 4/02* (2013.01); *H04W 4/21* (2018.02)

(58) Field of Classification Search
  CPC .......................................... G06Q 30/06–30/08
  USPC ................................................ 705/26.1–27.2
  See application file for complete search history.

(56) References Cited

U.S. PATENT DOCUMENTS

| | | | |
|---|---|---|---|
| 2008/0281670 A1* | 11/2008 | Boss | G06Q 20/20 705/16 |
| 2015/0120504 A1* | 4/2015 | Todasco | G06Q 20/322 705/26.61 |
| 2015/0149484 A1* | 5/2015 | Kelley | G06F 17/30398 707/748 |
| 2015/0348083 A1* | 12/2015 | Brill | G06O 30/0222 705/14.23 |

* cited by examiner

*Primary Examiner* — Ethan D Civan
(74) *Attorney, Agent, or Firm* — Haynes and Boone, LLP (57) ABSTRACT

There are provided systems and methods for a network of personalized devices determining data for shopping predictions. A personalized device may include processing components for determining purchase predictions for one or more items to purchase on behalf of a user. The purchase predictions may be based on personality traits and other information that may indicate interests of the user. The purchase predictions may also be based on purchase information for the item, including inventory of the item, price of the item, availability of the item to the user, or other factor. Once the purchase prediction is determined, the personalized device may generate a purchase request for the item from a merchant having the item at a physical merchant location accessible to the personalized device or a delivery device associated with the personalized device. The personalized device may retrieve and deliver the purchased item.

20 Claims, 5 Drawing Sheets

NETWORK OF PERSONALIZED DEVICES DETERMINING DATA FOR SHOPPING PREDICTIONS

TECHNICAL FIELD

The present application generally relates to a network of devices and purchasing predictions and more specifically to a network of personalized devices determining data for shopping predictions.

BACKGROUND

Users may wish to purchase one or more items from a merchant; however, the users may be otherwise busy in their day and inconvenienced by trips to merchant locations. Online shopping allows users to purchase goods electronically that are delivered to the user but still require a user to visit an online merchant (e.g., a merchant website or online marketplace) to shop with the merchant. Moreover, the user is required to know that the user wants or needs to purchase the item, which may not be the case for common household items that the user refills or replaces (e.g., beauty products such as soaps, shampoo, etc., as well as food, drinks, and other commonly purchased items). Online shopping further suffers from requiring delivery, which may not always be feasible within the required time or may require large fees for quick delivery. Thus, some users may utilize personal shoppers. However, personal shoppers may be expensive and imprint their own personality traits on purchases, thereby purchasing incorrect or sub-optimal items. Moreover, personal shoppers may not have the required authority to utilize a user's payment account or purchase restricted items (e.g., prescriptions for a user).

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a network of personalized devices determining data for shopping predictions. Systems suitable for practicing methods of the present disclosure are also provided.

A user may have one or more personality traits that may be entered to a system as preferences of the user. For example, the user may configure a personalized device with one or more preferences of the user by selecting the preferences, such as items of interest, required items, categories of items, subject matters of interest, or other selections related to items, subject matter, events, and/or interests. The user may utilize an application of the personalized device, which may present an application interface of the application for entry of the personality information using an input device. In other embodiments, the personalized device may be accessible through a communication device used by the user, which may connect with the personalized device in order to receive the personality information set by the user. Thus, the communication device may include an application and communication interface for entry of the personality information's preferences and communication of the preferences to the personalized device. In various embodiments, the communication of the preferences to the personalized device by the communication device may occur using short range wireless communications between the communication device and the personalized device (e.g., [incomplete]).

The personalized device may correspond to a single device, a network of devices, and/or a centralized device using one or more delivery devices. The personalized device may include a hardware processor and a non-transitory memory. The non-transitory memory may store the received personality information, such as the preferences. Moreover, the hardware processor may be in communication with the non-transitory memory to execute one or more processes using the personality information, as discussed herein. In various embodiments, the personalized device further includes a communication module or interface, which may be utilized to communicate with one or more nearby devices (e.g., the communication device of the user and/or a merchant device for a merchant selling an item) using short range wireless communications (e.g., NFC, Bluetooth, Bluetooth Low Energy, infrared, radio, WiFi, or other communication protocol). The communication interface may further be utilized to communication over a network with the aforementioned entities, as well as a payment provider, for example, to send and receive data. Thus, the personalized device may initiate and/or engage in one or more processes with another device, server, or other entity.

The personalized device may also receive, retrieve, or otherwise determine the personality information from one or more other sources accessible to the personalized device. For example, the personalized device may access one or more devices, sensors, servers, or other resources constituting the Internet of Things. The Internet of Things describes a principle whereby devices, sensors, servers, and other resources may be embedded in real world physical items or objects so that data for the objects may be detected and provided to other devices requesting the information. Thus, the personalized device may retrieve data from one or more real world objects. The data may be used to determine personality information for the user, such as interests of the user in items, subject matter, or other objects. For example, the personality information may include data associated with items, actions, locations, events, or other objects interacted with by the user. The data may be detected by one or more real world sensors associated with the objects (e.g., use of a household appliance, a vehicle, etc.). In such embodiments, the personality information may include use of an item by the user, an amount of use of the item by the user, purchase needs of the user, purchase interests of the user, and purchase requests for the item by the user. In other embodiments, a smaller distributed network of resources may be utilized to detect the personality information instead of the Internet of Things.

The data may also be received or retrieved from another device/service and/or scraped from an online resource (e.g., a social networking/microblogging website, an online feed, an account with the service provider or another website, etc.). For example, the user's actions may be indicative of a personality trait, such as if the user goes hiking, begins running, visits a merchant retail location, attends an event, or otherwise performs some real world or online action. Such actions may also be determined using a transaction history of the user (e.g., purchases of the user), locations of the user, or other retrievable data, including data determined by a communication device and/or secondary device (e.g., a biometric detection device, such as a FITBIT®). In further embodiments, the personality information of the user may also be determined using emails and messages sent or received by the user, social networking and microblogging posts by the user or mentioning the user, and/or other available data associated with the user. Thus, the personality information may include shopping by the user, online search engine searches by the user, actions taken by the user, biometrics of the user, locations visited by the user, media consumed by the user, and social networking and microblogging posts by the user, wherein the personality information may be updated over time based on newly retrieved data by the personalized device system.

Purchase information for at least one item and the user may also be determined by the personalized device. The purchase information may be stored to the non-transitory memory of the personalized device. The purchase information may be used to determine if and when to purchase an item by the personalized device. In this regard, the purchase information may, in certain embodiments, be detected or determined similar to the personality information from sensors, devices, servers, and other resources available on the Internet of Things or a smaller distributed network of resources. In such embodiments, the purchase information may correspond to a current amount of an item that the user has (e.g., an amount of bread in a home of the user, a level of gas in a vehicle of the user, a number of batteries in possession of the user) or a requirement for the item (e.g., detection of a required purchase of food or drink). The purchase information may therefore include information about a purchase need or interest of the user based on currently purchased and available items to the user (e.g., items in possession of the user and their current state). Thus, the purchase information may include information for a quantity, quality, repair state, renew state, or other information about an item in possession of the user.

The purchase information may also include information about an item of interest to the user (e.g., an item the user may wish to purchase based on the personality information and/or other purchase information). In this regard, the purchase information may be determined from information available from a merchant, such as a sale price of the item, availability of the item to the user at the merchant location, an available stock of the item, a discount of the item. The purchase information may also include information about whether the user can, should, or would like to purchase the item. In such embodiments, the purchase information may include a purchase schedule of the item by the user and available funds to the user. Other user information, such as potential travel by the user, a schedule of the user, current location of the user, biometrics of the user, health of the user, or other user information may also be included within the purchase information.

The personalized device may determine a purchase prediction using at least the personality information. For example, the personality information may indicate that the user has an interest in purchasing an item. The interest may be a requirement to purchase an item, such as new food, gas for a vehicle, a co-purchase (e.g., batteries, light bulbs, etc.), or other required purchase based on the user's personality traits. The purchase of the item may also be an indication that the user desires the item or would otherwise like to purchase the item, for example, in the case of new interests of the user. In such embodiments, the purchase prediction may correspond to a purchase of an item based on the user's behavior or personality traits that may be prospective and not required by the user. The purchase prediction may be used to determine future purchases of the user, and may be made to predict the purchase prior to the user requiring the item or wishing to purchase the item. Thus, the purchase prediction may be used to purchase an item prior to the user performing actions to purchase the item, such as through an online merchant or visiting a physical merchant location. The personality information may be used to determine a purchase prediction for an item (e.g., goods, services, etc.) according to an interest in the item itself or a category of items (e.g., cars, boats, etc.), an action (e.g., hiking, workouts, etc.), or other subject type. The purchase prediction may be presented to the user prior to the user approving or authorizing purchase of the corresponding item(s) in the purchase prediction. However, in other embodiments, the user may pre-authorize purchases so that the personalized device is automatically authorized to begin processing the purchase prediction to purchase the item. Moreover, the user may also establish preferences for what purchases are allowed (e.g., an amount, type of purchase, etc.).

The personalized device may further determine the purchase prediction using the purchase information. The purchase information may be used to determine whether a user requires or wishes to purchase an item, such as when the user's inventory of the item in possession of the user is low or empty (e.g., out of eggs, low on gas for a vehicle, etc.). The purchase information may therefore be used with the personality information to determine the purchase prediction of when the user needs or wants an item. The purchase information may also be used to determine when or where to purchase an item in the purchase prediction based not only on the item's information with the user (e.g., amount, quality, repair state, etc., of the item already in possession of the user) but also on the item's information with a merchant. For example, inventory level of the item with the merchant, a discount of the item, or other sales information for the item may be used to determine the purchase prediction. Thus, the purchase prediction may be made at a best or more ideal time for a user, such as when the item is discount, from a merchant providing a discount, and/or when the user has adequate funds.

Once a purchase prediction for an item is generated, the personalized device may generate a purchase request for the item. The purchase request may be for a transaction to purchase the item by providing a payment to a merchant selling the item and selected by the personalized device by the personalized device and on behalf of the user (e.g., using a payment instrument of the user, such as a payment card, payment account with a payment provider, bank account, or other financial instrument). The purchase request may be communicated to the merchant for processing (e.g., using a merchant's backend systems to process a payment using the payment instrument selected by the personalized device). In other embodiments, the purchase request may be communicated to an online payment provider that may process the purchase request by providing a payment to the merchant for the transaction for the item(s). Once processed, the personalized device has purchased the items on behalf of the user and may retrieve or have delivered the item(s) purchased on behalf of the user.

The personalized device may further include processes, hardware, and/or components that may allow the personalized device to retrieve the item after completing the transaction and providing payment to the merchant. For example, the personalized device may be implemented as a drone delivery device, which may be utilized to travel to a physical merchant location where the item is held by the merchant and retrieve the item from the merchant. In this regard, the personalized device may be capable of land and/or air travel, which may allow the personalized device to physically move between two or more locations. The personalized device may include the movement and/or motion components with the hardware processor and non-transitory memory. A network of similar personalized devices may also be used to provide purchase and retrieval of a plurality of items on behalf of the user. Thus, the personalized devices may each determine purchase predictions and communicate with each other to update personality and/or purchase information and perform purchases. However, in other embodiments, the components used for physical movement between two or more points may be included within one or more other delivery devices, which may be controlled by a centralized personality device to perform the purchase predictions and transaction processing.

In various embodiments, a transaction for one or more items may require authentication, proof of identification, and/or proof of age. For example, prescription medications may require a driver's license or other identification card to be presented by a user on purchase. Similarly, alcohol and other restricted items may require proof of age or other authorization. In such embodiments, the personalized device and/or delivery device may include required authentication that may be presented to the merchant on retrieval of the items. The authentication may include a voice or audio playback of the user, a call or a message to the user while the delivery device is at the physical merchant location, a personalized identification of the user, a username and a password for an account of the user, a thumbprint of the user, a payment card of the user, and an identification card of the user. In other embodiments, a key arrangement or other encrypted data sharing a cryptographic technique may be shared between the personalized device and a merchant device for the user. Thus, the personalized device may provide an encrypted token associated with the cryptographic technique to a delivery device, which may be presented to the merchant on retrieval of the item by the delivery device. For example, an asymmetric key pair may be used to encrypt a token, which may be decrypted by the merchant's device when the delivery device presents the encrypted token to the merchant's device (e.g., using short range wireless communications when the delivery device arrives at the merchant location). Moreover, the authentication may be used on retrieval of items so insure that the delivery device retrieving the items actually belongs to the user and is not fraudulent. Thus, the authentication may be used to prevent theft and fraud by other users using delivery devices and allow the merchant to prevent loss.

The items may further be delivery to a location of the user. The location may correspond to a current location of the user, which may be entered by the user or determined using a communication device having location services technology (e.g., GPS). The location of the user may be provided to the delivery device in possession of the item(s), and the delivery device may include mapping and/or location detection technology to track and move to the location. In other embodiments, the location may be set as a home location, a work location, or another location specified by the user, which may be limited in time (e.g., a friend's house, a public park, etc.). The personalized device may also make intelligent choices of the delivery location, for example, using a schedule of the user and/or other available user information.

The personalized device may be utilized for reordering of items. For example, the purchase information having a current stock or inventory of an item in possession of a user may be tracked by the personalized device for reordering on behalf of the user. Additionally, the personality information for the user may also be used to determine how often or how much of the item the user uses over time, in order to predict when reordering may be required. Other personality and/or purchase information may also be tracked, such as a quantity, quality, repair status, and/or renewal status of the item. Thus, the personalized device may be used to make intelligent purchasing of one or more items on behalf of the user.

Figure 1:
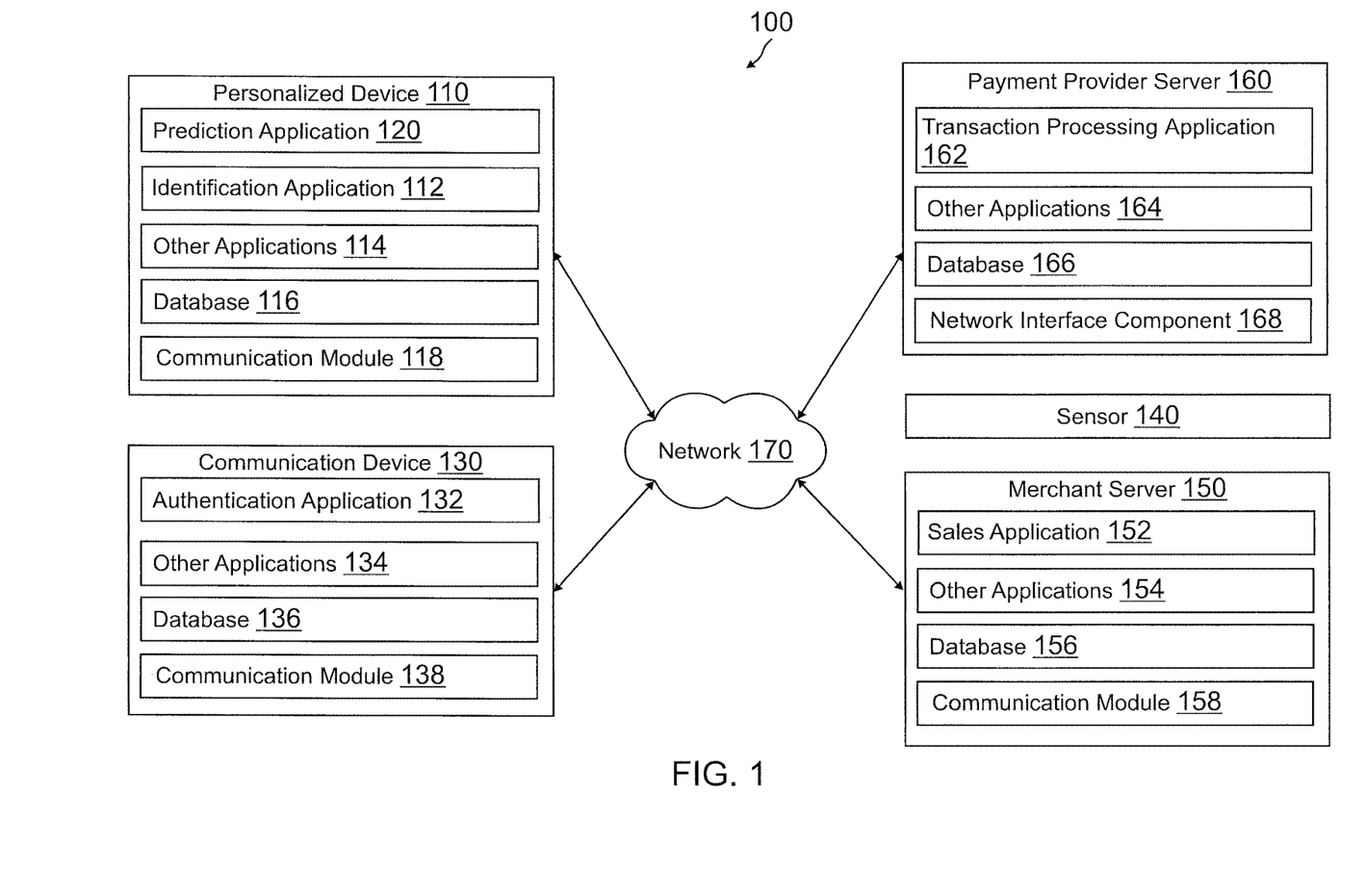
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user, a personalized device 110, a communication device 130, a sensor 140, a merchant device 150, and a payment provider server 160 in communication over a network 170. Personalized device 110 may be established by a user (not shown) that sets up personalized device 110 to determine purchase predictions and perform shopping for items determined in the purchase predictions. Personalized device 110 may utilize personality and/or purchase information, which may be accessed at least in part from communication device 130, sensor 140, and merchant device 150. The user may also utilize communication device 130 to utilize the various features available for communication device 130, which may include processes and/or applications associated with personalized device 110, for example, providing personality information and/or authentication. Personalized device 110 may further purchase an item based on the determined purchase prediction from merchant device 150. When processing a transaction for the item(s), personalized device 110 may utilize payment provider server 160 to process transactions.

Personalized device 110, communication device 130, sensor 140, merchant device 150, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Personalized device 110 may be implemented as a communication device that may utilize appropriate hardware and software configured for wired and/or wireless communication with communication device 130, merchant device 150, and/or payment provider server 160. For example, in one embodiment, personalized device 110 may be implemented as a personal computer (PC), a smart phone, laptop/tablet computer, wearable computing device, implantable communication devices, and/or other types of computing devices capable of transmitting and/or receiving data, such as an IPAD® from APPLE®. In other embodiments, personalized device 110 may also correspond to a drone device capable of travel and movement, such as a drink configured to travel across land and/or through air. However, in other embodiments, personalized device 110 may instead use one or more delivery devices, which may include movement and travel components, such as a delivery drone. Although only one device is shown, a plurality of devices may function similarly.

Personalized device 110 of FIG. 1 contains a prediction application 120, an identification application 112, other applications 114, a database 116, and a communication module 118. Prediction application 120, identification application 112, and other applications 114 may correspond to executable processes, procedures, and/or applications with associated hardware. In other embodiments, personalized device 110 may include additional or different modules having specialized hardware and/or software as required.

Prediction application 120 may correspond to one or more processes to execute software modules and associated devices of personalized device 110 to generate purchase predictions for one or more items based on personality information and/or purchase information, and process purchase requests for the item(s) in the purchase predictions. In this regard, prediction application 120 may correspond to specialized hardware and/or software utilized by a user of personalized device 110 to first determine personality information for a user associated with personalized device 110 and/or access the personality information from a non-transitory memory of personalized device 110. The user may be a user that sets-up and establishes personalized device 110 to perform shopping and purchases on behalf of the user. Thus, the personality information may correspond to personality traits and other information for the user that may be used to determine purchases for the user, for example, purchases for one or more items of interest to the user that are sold from a merchant. The personality information may correspond to preferences and/or parameters set by the user for items to purchase. The preferences and/or parameters may be set by the user using an input device of personalized device 110 and interface of prediction application 120, or may be set with personalized device 110 and communicated to personalized device 120 by personalized device 110. The preferences may correspond to one or more items the user would like personalized device 110 to purchase, such as requests to purchase food, drinks, household products, fuel, etc. The preferences may also be for items of interest that the user may wish to purchase, including new furniture, electronics, etc. The parameters may correspond to purchasing conditions for the item(s), including when the items are required to be purchased by, how often the items need to be reordered, a quantity of items required to be available to the user, a purchase price for the items, a discount or other benefit for the items, a quality of the items, a required repair state of the items, selected merchants selling the item, or other parameter associated with when and where to purchase the item.

Prediction application 120 may also determine the personality information from information available to prediction application 120, including information determined using one or more applications of personalized device 110 and/or accessible, retrievable, or request-able over network 170. For example, applications executed by personalized device 110 may detect the user's actions, purchases, biometrics, locations, messaging, social networking, or other user information, which may be processed to determine personality traits of the user and items the user is interested in purchasing. The aforementioned information may also be received from an online resource, such as a device, server, database, or other data storage and processing device. In other embodiments, prediction application 120 may access one or more resources (e.g., constituting a part of the Internet of Things (IoT)) to determine the aforementioned information, such as sensor 140 (where sensor 140 may be embedded in a real world object for detection of data about the user). In various embodiments, personalized device 110 and/or a device in connection with personalized device 110 may determine the user's information. The user information may be indicative of an interest or requirement to purchase an item, a category of items, and/or a subject matter. For example, a user located at a park and exercising may be interested in running/hiking shoes. Once the personality information is determined by prediction application 120, the personality information may be stored to database 116 and/or utilized to determine purchase predictions.

Prediction application 120 may also determine and/or access purchase information for use in determining purchase predictions. Purchase information may correspond to a plurality of sub-types of data, include item information, sales information, merchant information, and/or item availability information (e.g., detected by a sensor or device connected to the Internet of Things, such as sensor 140). In this regard, purchase information may correspond to information used to determine if and when to purchase an item by the personalized device. For example, purchase information may correspond to information about items currently in possession of the user, such as a current amount of an item that the user has (e.g., amount of food/drink in a home, amount of fuel, etc.) or a requirement for the item to be in available to the merchant (e.g., detection of no remaining items at a location for the user, or an absence of a desired product at the location). Thus, the purchase information may correspond to a purchase need or interest of the user based on currently or previously purchased and available items to the user (e.g., items in possession of the user and their current state). Such information about items in possession of the user may correspond to a quantity, quality, repair state, renew state, or other information.

In other embodiments, the purchase information may be detected for items not in possession of the user but of interest to the user, such items available at a merchant location. Thus, other purchase information may also correspond to an item of interest to the user (e.g., an item the user may wish to purchase, which may be determined using the personality information and/or other purchase information). In this regard, the purchase information may be determined from information available from a merchant and/or merchant device (e.g., merchant device 150), such as a sale price of the item, availability of the item to the user at the merchant location, an available stock of the item, a discount of the item. Sensor 140 may also detect the information where sensor 140 may be located at the merchant location. The purchase information may also include information about whether the user can, should, or would like to purchase the item. For example, a purchase schedule of the item by the user and available funds to the user may also be used to determine when to purchase. Other user information, such as potential travel by the user, a schedule of the user, current location of the user, biometrics of the user, health of the user, or other user information may also be included within the purchase information.

Prediction application 120 may be used to determine purchase predictions for one or more items to purchase on behalf of the user associated with personalized device 110. In this regard, prediction application 120 may access the personality information to determine the purchase predictions. For example, a purchase prediction may be for an item that the user would like to purchase or would be required to purchase. An item a user may wish to purchase may correspond to an item of interest to the user determined based on the user's personality traits (e.g., hiking gear if the user is interested in hiking, types of food based on the user's food tastes, or other items that the user may find interesting). An item that the user is required to purchase may correspond to items that the user may require, including household items, food/drink, fuel, or other types of items that the user requires. Thus, a purchase prediction may correspond to a purchase of an item for a user based on the user's personality information. The item may correspond to a category of items, which may include a level of granularity to the category (e.g., food, fruit, and/or bananas), or may correspond to a specific item (e.g., STARBUCK® hazelnut coffee). Additionally, the purchase prediction may also be determined by the purchase information. For example, the purchase information may be used to determine when to purchase an item on behalf of the user, such as when a stock available to the user runs low or is empty, when the item is on sale, or otherwise. Moreover, prediction application 120 may be used to determine a merchant and a merchant location for purchase of the item in the purchase prediction.

After determination of the purchase prediction for one or more items, prediction application 110 may process the purchase prediction by generating a purchase request for the item(s) in the purchase prediction. The purchase request may include a payment to the merchant selected in the purchase prediction. The payment may correspond to a payment instrument communicated to the merchant (e.g., through merchant device 150) for processing by the merchant's backend processing system (e.g., credit card processing features, bank account debiting features, processing of gift cards or benefits, check processing, etc.). In other embodiments, prediction application 120 may utilize a payment account with payment provider server 160 for payment, which may be processed by payment provider server 160 to provide a payment to the merchant associated with merchant device 150. In various embodiments, the user may be required to authorize the purchase request. However, in other embodiments, the user may preauthorize the purchase request and/or other purchase requests so the processing may be completed without requiring the user to sign off on the transaction and purchase request. Moreover, the user may set parameters for automatic authorization of purchase requests.

Prediction application 120 may also be used to initiate a retrieval of the item from a physical merchant location after generating the purchase request. Where personalized device 110 corresponds to a drone delivery device, personalized device 110 may travel to a physical merchant location where the item is held by the merchant and retrieve the item from the merchant. Thus, personalized device 110 may include the movement and/or motion components with the hardware processor and non-transitory memory necessary to retrieve the item from the physical merchant location and deliver the item to the user. However, in other embodiments, the components used for physical movement between two or more points may be included within one or more other delivery devices (e.g., separate drone devices), which may be controlled by personalized device 110. Prediction application 120 may cause the item to be delivered to the user after retrieval of the item, which may correspond to the user's current location, home, work, or other specified location.

Identification application 112 may correspond to one or more processes to execute software modules and associated devices of personalized device 110 to provide authentication of the user associated with personalized device 110 where authentication may be require for retrieval of the item purchased using prediction application 120. In this regard, identification application 112 may correspond to specialized hardware and/or software utilized by personalized device 110 to provide authentication, proof of identification, and/or proof of age (e.g., in the case of prescription medications, alcohol, or other restricted items). The authentication may include a voice or audio playback of the user, a call or a message to the user while the delivery device is at the physical merchant location, a personalized identification of the user, a username and a password for an account of the user, a thumbprint of the user, a payment card of the user, and an identification card of the user. In other embodiments, a key arrangement or other encrypted data sharing a cryptographic technique may be shared between the personalized device and a merchant device for the user. Thus, personalized device 110 may provide an encrypted token associated with the cryptographic technique to a delivery device, which may be presented to the merchant on retrieval of the item by the delivery device. For example, an asymmetric key pair may be used to encrypt a token, which may be decrypted by the merchant's device when the delivery device presents the encrypted token to the merchant's device (e.g., using short range wireless communications when the delivery device arrives at the merchant location). Moreover, the authentication may be used on retrieval of items so insure that the delivery device retrieving the items actually belongs to the user and is not fraudulent. Thus, the authentication may be used to prevent theft and fraud by other users using delivery devices and allow the merchant to prevent loss.

One or more of the aforementioned features and/or processes of prediction application 120 may be included within identification application 112 or vice versa, for example, to provide their respective features within one application and/or application interface.

In various embodiments, personalized device 110 includes other applications 114 as may be desired in particular embodiments to provide features to personalized device 110. For example, other applications 114 may include security applications for implementing client-side security features, programmatic client applications for interfacing with appropriate application programming interfaces (APIs) over network 170, or other types of applications. In various embodiments, other applications 114 may include financial applications, such as banking, payments, or other applications (e.g., a payment application for payment provider server 160 that may provide payments to a merchant associated with merchant device 150). Other applications 114 may also include other location detection applications, which may be used to determine a location for the user and/or merchant, such as a mapping, compass, and/or GPS application, which can include a specialized GPS receiver that obtains location information for personalized device 110 and processes the location information to determine a location of personalized device 110 and the user.

Other applications 114 may be utilized to determine user data or other information, which may be communicated to payment provider server 160. For example, other applications 114 may collect, capture, and/or otherwise determine user data and other information for the user. Other applications 114 may include device interfaces and other display modules that may receive input from the user and/or output information to the user. For example, other applications 114 may contain software programs, executable by a processor, including a graphical user interface (GUI) configured to provide an interface to the user. Other application 114/134 may therefore use devices of personalized device 110, such as display devices, including GUI's capable of displaying information to users and other output devices, including speakers. Personalized device 110 may include input devices, including touch screens. Personalized device 110 may include a sensor or other component used to collect the information associated with the user and/or item, such as an input device, a camera, a microphone, an accelerometer, a motion detector, an environmental sensor, and/or a biometric sensor.

Personalized device 110 may further include database 116 stored to a transitory and/or non-transitory memory of personalized device 110, which may store various applications and data and be utilized during execution of various modules of personalized device 110. Thus, database 116 may include, for example, identifiers such as operating system registry entries, cookies associated with prediction application 120, identification application 112, and/or other applications 114, identifiers associated with hardware of personalized device 110, or other appropriate identifiers, such as identifiers used for payment/user/device authentication or identification, which may be communicated as identifying personalized device 110 to payment provider server 160. Database 116 may include personality and/or purchase information, and purchase predictions determined using the personality and/or purchase information. Additionally, database 116 may authentication information, purchase requests, and processed purchase requests.

Personalized device 110 includes at least one communication module 118 adapted to communicate with communication device 130, sensor 140, merchant device 150, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Communication device 130 may be implemented as a communication device that may utilize appropriate hardware and software configured for wired and/or wireless communication with personalized device 110, merchant device 150, and/or payment provider server 160. For example, in one embodiment, communication device 130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 130 of FIG. 1 contains an authentication application 132, other applications 134, a database 136, and a communication module 138. Authentication application 132 and other applications 134 may correspond to executable processes, procedures, and/or applications with associated hardware. In other embodiments, communication device 130 may include additional or different modules having specialized hardware and/or software as required.

Authentication application 132 may correspond to one or more processes to execute software modules and associated devices of communication device 130 to authorize a purchase request and provide authentication for the purchase request when required. In this regard, authentication application 132 may correspond to specialized hardware and/or software utilized by a user of communication device 130 that may be used to authorize a purchase request generated by personalized device 110 when required. For example, the user associated with personalized device 110 may set parameters for purchase requests where the user is required to authorize the purchase request prior to processing. Thus, the purchase request may be presented to the user through authentication application 132, where the user may accept the purchase request using an input device of communication device 130 and/or an application interface. Moreover, where authentication is required for release of an item to personalized device 110, authentication application 132 may be utilized to provide the authentication. For example, a voice input, username/password, identification card or number, or other information may be entered to authentication application 132 and communicated to personalized device 110 and/or merchant device 150. Such authentication may occur when personalized device 110 is at a physical merchant location to retrieve the item purchase through the purchase request.

In various embodiments, communication device 130 includes other applications 134 as may be desired in particular embodiments to provide features to communication device 130. For example, other applications 134 may include security applications for implementing client-side security features, programmatic client applications for interfacing with appropriate application programming interfaces (APIs) over network 170, or other types of applications. Other applications 134 may also include email, texting, voice and IM applications that allow a user to send and receive emails, calls, texts, and other notifications through network 170. In various embodiments, other applications 134 may include financial applications, such as banking, online payments, money transfer, or other applications. Other applications 134 may also include other location detection applications, which may be used to determine a location for the user, such as a mapping, compass, and/or GPS application, which can include a specialized GPS receiver that obtains location information for communication device 130 and processes the location information to determine a location of communication device 130 and the user. Other applications may include social networking applications, media viewing, and/or merchant applications.

Other applications 134 may also be associated with other devices, such as biometric devices and other types of accessible or connected devices. For example, other applications 134 may be associated with a secondary device, such as a FITBIT@. Thus, other applications 134 may collect, capture, and/or otherwise determine user data and other information for the user, which may be used to determine interests and knowledge in interests. The user's information may correspond to locations of the user, which may further be determined using a location determination system, such as a GPS module of communication device 130 and associated systems, calendaring/scheduling information, biometrics, etc. Other applications 134 may include device interfaces and other display modules that may receive input from the user and/or output information to the user. For example, other applications 134 may contain software programs, executable by a processor, including a graphical user interface (GUI) configured to provide an interface to the user. Other application 114/134 may therefore use devices of communication device 130, such as display devices, including GUI's capable of displaying information to users and other output devices, including speakers. Communication device 130 may include input devices, including touch screens. Communication device 130 may include a sensor or other component used to collect the current information associated with the user, such as an input device, a camera, a microphone, an accelerometer, a motion detector, an environmental sensor, and/or a biometric sensor.

Communication device 130 may further include database 136 stored to a transitory and/or non-transitory memory of communication device 130, which may store various applications and data and be utilized during execution of various modules of communication device 130. Thus, database 136 may include, for example, identifiers such as operating system registry entries, cookies associated with authentication application 132 and/or other applications 134, identifiers associated with hardware of communication device 130, or other appropriate identifiers, such as identifiers used for payment/user/device authentication or identification, which may be communicated as identifying communication device 130 to payment provider server 160. Database 136 may include authentication information as well as received purchase requests and processed purchase requests (e.g., receipts or other transaction histories for a transaction completed through the processed purchase request). Additionally, database 136 may store account information and/or account preferences for an account with payment provider server 160.

Communication device 130 includes at least one communication module 138 adapted to communicate with communication device 130, merchant device 150, and/or payment provider server 160. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with nearby devices using short range communications, such as Bluetooth Low Energy, LTE Direct, WiFi, radio frequency, infrared, Bluetooth, and near field communications.

Sensor 140 may correspond to a physical sensor mounted in a real world object that may be used to detect and determine personality and/or purchase information. For example, sensor 140 may be embedded within a device or object to detect information about the user associated with personalized device 110 and communication device 130. Thus, sensor 140 may determine personality information, such as actions of a user, purchases, locations, etc. In other embodiments, sensor 140 may be embedded or associated with an item, which may correspond to an item already owned/in possession of the user and/or an item available at a merchant location. In such embodiments, sensor 140 may be detect item information, including an amount of an item, a state of the item, a location of the item, or other information about the item.

Merchant device 150 may be implemented using any appropriate hardware and software configured for wired and/or wireless communication with communication device 130 and/or payment provider server 160. Merchant device 150 may correspond to a device, server, or cloud computing architecture to provide sales of items, for example, through a physical merchant location and/or an online marketplace accessible over a network connection that has a corresponding physical location for retrieval of one or more sold items. Merchant device 150 may further be used to process payments for items, provide incentives for purchase of items, advertise items, and/or allow release of items to personalized device 110. Although a merchant device is shown, the merchant device may be managed or controlled by any suitable processing device. Although only one merchant device is shown, a plurality of merchant devices may function similarly.

Merchant device 150 of FIG. 1 contains a sales application 152, other applications 154, a database 156, and a communication module 158. Sales application 152 and other applications 154 may correspond to processes, procedures, and/or applications executable by a hardware processor, for example, a software program. In other embodiments, merchant device 150 may include additional or different modules having specialized hardware and/or software as required.

Sales application 152 may correspond to one or more processes to execute modules and associated specialized hardware of merchant device 150 to sell one or more items offered by a merchant (not shown) associated with merchant device 150, and further provider checkout and payment processes for a transaction to purchase the items for sale from the merchant corresponding to merchant device 150. In this regard, sales application 152 may correspond to specialized hardware and/or software of merchant device 150 to provide a convenient interface to permit a merchant offer items for sale. For example, sales application 152 may be implemented as an application offering items for sale that may be accessed by personalized device 110. In certain embodiments, sales application 152 may correspond to a website available over the Internet and/or online content and/or database information accessible through a dedicated application. Thus, sales application 152 may provide item sales through an online marketplace using the website of the merchant. In other embodiments, sales application 152 may provide sale of items in a physical location, such as a physical merchant retail location.

Sales application 152 may include information for a price for the item, a discount for the item, a price change for the item, and/or other incentives for items and/or with the merchant corresponding to merchant device 150 (e.g., rebates, payments, etc.). Sales application 152 may be used to set and/or determine a benefit or incentive provided as purchase information. Additionally, the sales data and other item data in the purchase information may be retrievable by personalized device 110, such as request-able through an API call and/or retrievable from a database. The information may be based updated periodically or continuously, such as in real time and information for the item(s) for sale changes. Sales application 152 may be used to establish a transaction once personalized device 110 has selected one or more items for purchase in a purchase prediction and generated a purchase request. Once a payment amount is determined for the transaction for the item(s) to be purchased, sales application 152 may request payment from personalized device 110. Sales application 152 may receive payment processing information, such as a purchase request. In such embodiments, the purchase request may be processed, payment provided to the merchant account, and notification of payment (or failure, for example, where there are insufficient user funds) may be sent to sales application 152. The payment may be made by payment provider server 160 on behalf of the user associated with personalized device 110. Sales application 152 may then receive the results of the transaction processing, and complete the transaction with the user, for example, by providing the user the items for the transaction or declining the transaction where the user is not authenticated or the transaction is not authorized (e.g., insufficient funds).

Merchant device 150 includes other applications 154 as may be desired in particular embodiments to provide features to merchant device 150. For example, other applications 154 may include security applications for implementing server-side security features, programmatic client applications for interfacing with appropriate application programming interfaces (APIs) over network 170, or other types of applications. Other applications 154 may also include email, texting, voice and IM applications that allow a user to send and receive emails, calls, texts, and other notifications through network 170. In various embodiments, other applications 154 may include financial applications, such as banking, online payments, money transfer, or other applications associated with payment provider server 160. Other applications 154 may contain software programs, executable by a processor, including a graphical user interface (GUI) configured to provide an interface to the user.

Merchant device 150 may further include database 156 which may include, for example, identifiers such as operating system registry entries, cookies associated with sales application 152 and/or other applications 154, identifiers associated with hardware of merchant device 150, or other appropriate identifiers, such as identifiers used for payment/user/device authentication or identification. Identifiers in database 156 may be used by a payment/credit provider, such as payment provider server 160, to associate merchant device 150 with a particular account maintained by the payment/credit provider. Item, sales, and/or benefit information for items sold by the merchant associated with merchant device 150 may be stored to database 156. Database 156 may further include transaction information and/or results, including transaction histories.

Merchant device 150 includes at least one communication module 158 adapted to communicate with communication device 130 and/or payment provider server 160. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 160 may be maintained, for example, by an online service provider, which may provide connection services on behalf of users. In this regard, payment provider server 160 includes one or more processing applications which may be configured to interact with communication device 130, merchant device 150, and/or another device/server to facilitate connecting users having a shared interest. In one example, payment provider server 160 may be provided by PAYPAL®, Inc. of San Jose, Calif., USA. However, in other embodiments, payment provider server 160 may be maintained by or include another type of service provider, which may provide connection services to a plurality of users.

Payment provider server 160 of FIG. 1 includes a transaction processing application 162, other applications 154, a database 156, and a network interface component 168. User connection application 170, transaction processing application 162, and other applications 154 may correspond to executable processes, procedures, and/or applications with associated hardware. In other embodiments, payment provider server 160 may include additional or different modules having specialized hardware and/or software as required.

Transaction processing application 162 may correspond to one or more processes to execute software modules and associated specialized hardware of payment provider server 160 to establish, maintain, and provide a payment account to a user based on the user's payment instruments and provide payments using the payment account and/or payment instruments. In this regard, transaction processing application 162 may correspond to specialized hardware and/or software to receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processing application 162 may further allow the user to service and maintain the payment account, for example, by adding and removing payment instruments. Additionally, benefits received from merchant device 150 for connecting with another user may be stored and/or redeemed using transaction processing application 162. Transaction processing application 162 may receive a purchase request from personalized device 110, as discussed herein. Transaction processing application 162 may be used to provide a payment for an item to a merchant, such as merchant device 150. Transaction processing application 162 may debit an account of the user automatically and provide the payment to an account of the merchant. Transaction processing application 162 may also be used to provide transaction histories for processed transactions.

In various embodiments, payment provider server 160 includes other applications 154 as may be desired in particular embodiments to provide features to payment provider server 134. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing payment provider server 160, where the user or other users may interact with the GUI to more easily view and communicate information. In various embodiments, other applications 154 may include connection and/or communication applications, which may be utilized to communicate information to over network 170.

Additionally, payment provider server 160 includes database 156. As previously discussed, the user and/or the merchant corresponding to telecommunication carrier server 170 may establish one or more digital wallets and/or payment accounts with payment provider server 160. Digital wallets and/or payment accounts in database 156 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to payment provider server 160, e.g. from communication device 130, one or more digital wallets and/or payment accounts belonging to the users may be found.

In various embodiments, payment provider server 160 includes at least one network interface component 168 adapted to communicate communication device 130 and/or merchant device 150 over network 170. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
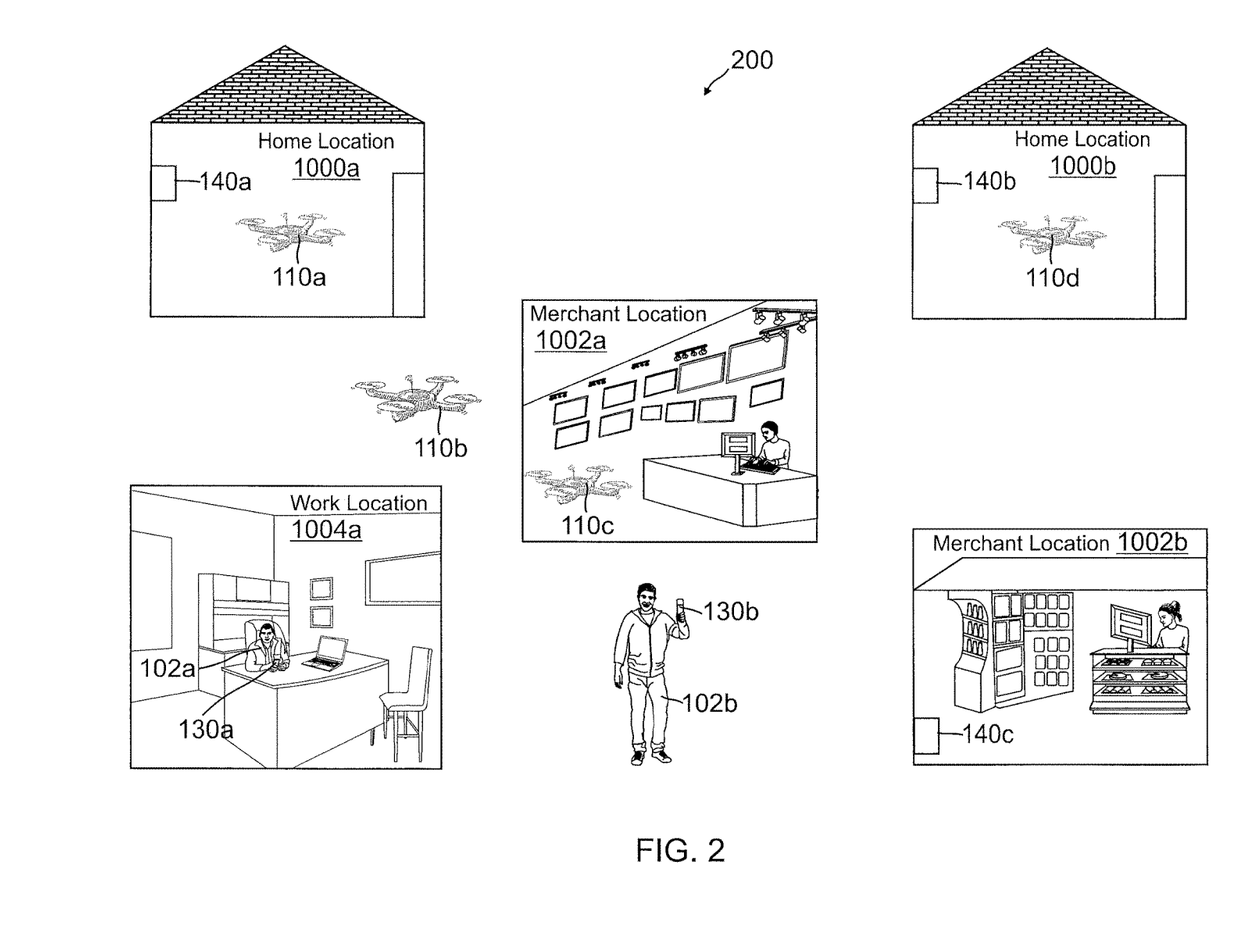
FIG. 2 is exemplary environment with multiple personalized devices utilized to perform shopping predictions and purchases for users at various locations, according to an embodiment.

FIG. 2 is exemplary environment with multiple personalized devices utilized to perform shopping predictions and purchases for users at various locations, according to an embodiment. Environment 200 includes a personalized device 110a, a personalized device 110b, a personalized device 110c, and a personalized device 110d corresponding generally to personalized device 110 in environment 100 of FIG. 1. In this regard, a user 102a and a user 102b may utilize personalized device 110a-d to perform personalized shopping based on purchase predictions for user 102a and 102b. Communication device 130a and communication device 130b also corresponds generally to communication device 130 in environment 100 of FIG. 1. Additionally, environment 200 includes a sensor 140a, a sensor 140b, and a sensor 140c corresponding generally to sensor 140 in environment 100 of FIG. 1.

In environment 200, user 102a may wish to purchase items from a merchant location 1002a and/or a merchant location 1002b. User 102a may reside at home location 1000a, and may establish personalized device 110a and personalized device 110b as devices to perform shopping on behalf of user 102a. In this regard, personalized device 110a and personalized device 110b may each include memories, processors, and/or components necessary to determine purchase predictions and perform shopping on behalf of user 102a based on personality information for user 102a and/or purchase information for one or more items. For example, personalized device 110a may determine a purchase prediction for an item at home location 1000a, such as a household product, food, and/or drink. Such determination may be based on a use pattern, interest, requirement, or other information about user 102a. Additionally, information about the item at home location 1000a may also be determined using sensor 140a, which may detect a quantity, quality, state, or other information about the item. In environment 200, the item may be an item that requires refilling, such as a food or drink product. However, as personalized device 110a is still located at home location 1000a, personalized device 110a may have determined a purchase prediction that indicates that a present purchase is not ideal, and personalized device 110a remains in an idle state at home location 1000a.

However, personalized device 110b may have determined a purchase prediction for user 102a based on personality information and purchase information determined using information from devices available at one or more of merchant location 1002a and/or merchant location 1002b. Additionally, the purchase information may also be determined using sensor 140a at home location 1000a for user 102a and/or sensor 140c at merchant location 1002b. Thus, personalized device 110b is located outside of home location 1000a and travelling to one of merchant location 1002a and/or merchant location 1002b in order to retrieve an item purchase based on the purchase prediction. Personalized device 110b may delivery the item to home location 1000a where personalized device 110b is restocking the item for user 102a at home location 1000a. However, where user 102a requires the item while at work location 1004, personalized device 110b may delivery the item to user 102a at work location 1004. Moreover, user 102a may utilize communication device 130a to provide authentication and/or authorization where personalized device 110b may require the authentication/authorization to purchase the item In similar fashion to personalized device 110a, personalized device 110d may also have determined that an item at home location 1000b for user 102b is not required to be purchased at the present time. Thus personalized device 110d may idle at home location 1000b until a purchase prediction is generated by personalized device 110d. However, user 102b may require an item prior to travelling back to home location 1000b, such as food, drinks, or other household products. In such embodiments, personalized device 110c may generate a purchase prediction for an item available at merchant location 1002a and travel to merchant location 1002a in order to purchase the item. Personalized device 110c may process the purchase request so that the purchase in made prior to or on arrival of personalized device 110c at merchant location 1002a. User 102b may be advised of the purchase using communication device 130b, such as an alert that that the purchase is made and the item will be available at home location 1000b.

Figure 3:
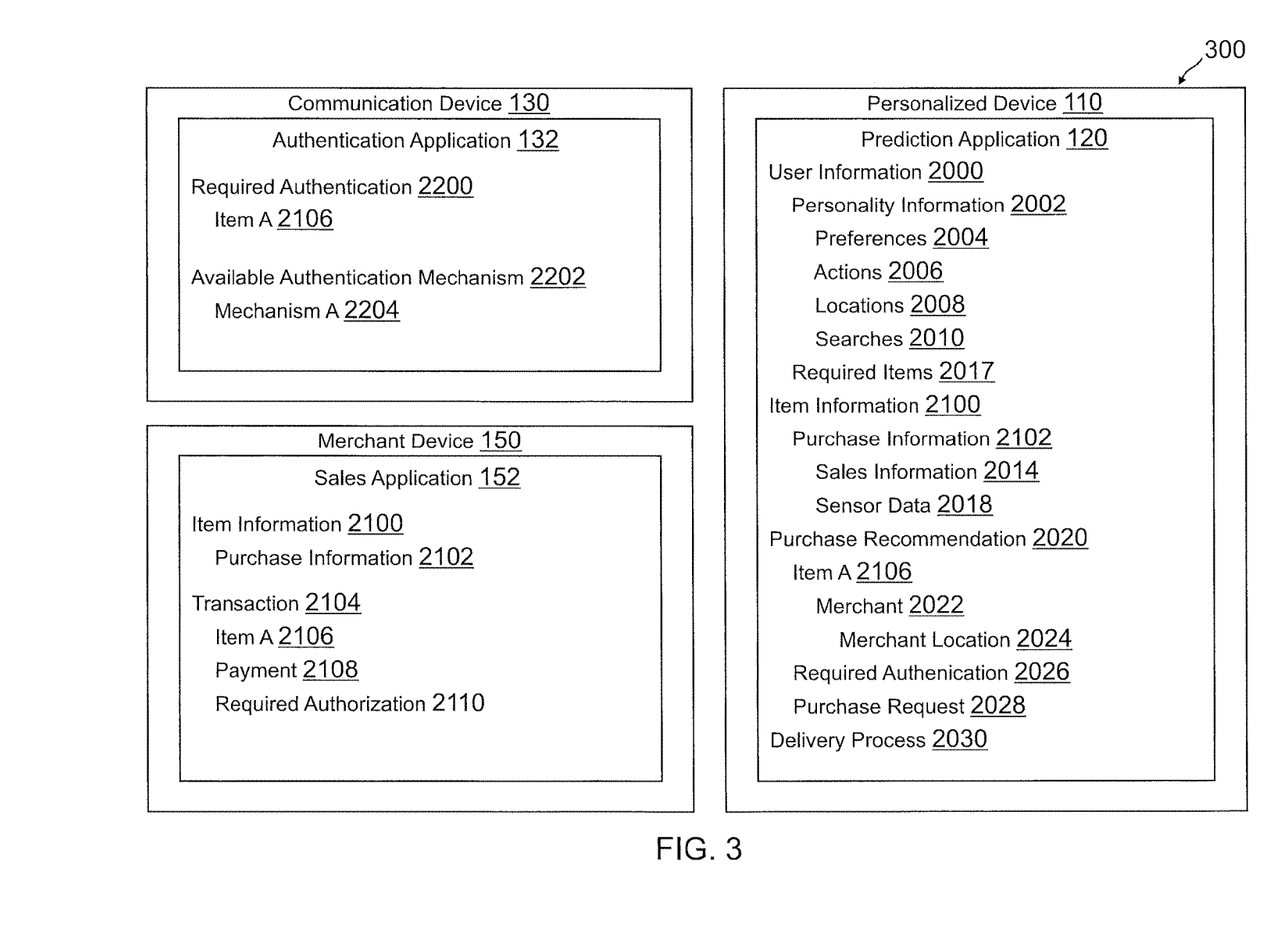
FIG. 3 is an exemplary system environment a personalized device performing purchase predictions based on received data for personality information and purchase information, according to an embodiment.

FIG. 3 is an exemplary system environment a personalized device performing purchase predictions based on received data for personality information and purchase information, according to an embodiment. FIG. 3 includes personalized device 110, a communication device 130, and a merchant device 150 all discussed in reference to environment 100 of FIG. 1.

Personalized device 110 executes prediction application 120 corresponding generally to the specialized hardware and/or software modules and processes described in reference to FIG. 1. In this regard, prediction application 120 may determine purchase predictions based on information available to prediction application 120, such as user information 2000 and/or item information 2100. User information 2000 may include personality information 2002 for a user (not shown) associated with personalized device 110. For example, personality information 2002 includes preferences 2004 that may be established by the user with personalized device 110. Moreover, other information may be determined by personalized device 110 for personality information 2002 without user input, such as actions 2006 (e.g., conduct by the user), locations 2008 (e.g., detected for the user and visited by the user), and/or searches 2010 (e.g., online search engine searches by the user) for the user. In other embodiments, additional information may also be determined.

Item information 2100 may correspond to information available from merchant device 150, for example, through accessing sales application 152 (e.g., where personalized device 110 may conduct one or more processes to access/utilize an API of sales application 152 to retrieve and/or determine item information 2100). Merchant device 150 executes sales application 152 corresponding generally to the specialized hardware and/or software modules and processes described in reference to FIG. 1. In this regard, sales application 152 includes item information 2100, which may correspond to purchase information 2102. Sales application 152 may provide item information 2100 to prediction application 120, which may utilize sales information 2014 from merchant device 150. Additionally, personalized device 110 may interact with one or more sensors to determine sensor data 2018 included within item information 2100.

Purchase recommendation 2020 may be determined by prediction application 120. Purchase recommendation 2020 may be for an item A 2106, which may be available from merchant 2022 having a merchant location 2024. Moreover, purchase recommendation 2020 may include required authentication 2026. Required authentication 2026 may be communicated to merchant device 150 and/or may be authorized by the user using communication device 130. In this regard, communication device 130 executes authentication application 132 corresponding generally to the specialized hardware and/or software modules and processes described in reference to FIG. 1. Authentication application 132 may include messages used to provide authentication and/or authorization by the user. For example, authentication application 132 includes required authentication 2200 for item A 2106, which may be presented to the user. Moreover, authentication application 132 may include available authentication mechanisms 2202 that may be utilized by the user, such as a mechanism A 2204 (e.g., identification card, username and password, voice data, image, etc.). Prediction application 120 may further determine a purchase request 2028 for use in processing a transaction with merchant device 150. Purchase request 2028 may be processed using an online payment provider, and sales application 152 may complete a transaction 2104 for item A 2106. For example, purchase request 2028 may be used to provide a payment 2108 to merchant device 150. Moreover, authentication mechanism A 2204 may be used to provide required authorization 2110 to sales application 152.

Figure 4:
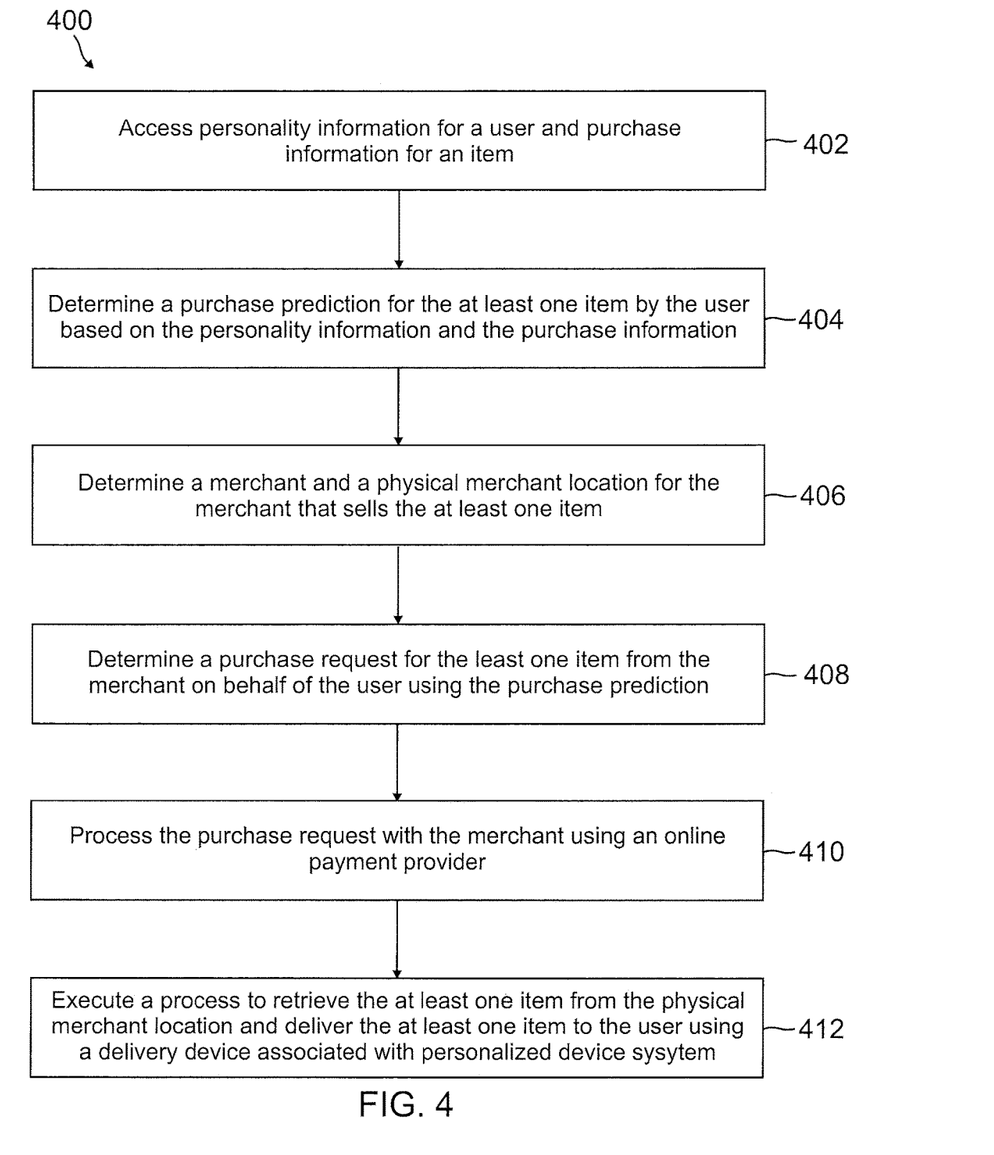
FIG. 4 is a flowchart of an exemplary process for a network of personalized devices determining data for shopping predictions, according to an embodiment.

FIG. 4 is a flowchart of an exemplary process for a network of personalized devices determining data for shopping predictions, according to an embodiment. Note that one or more steps, processes, and methods described herein may be omitted, performed in a different sequence, or combined as desired or appropriate.

At step 402, personality information for a user is determined and/or accessed by a personalized device system that comprises one or more hardware processors coupled to a non-transitory memory. The personality information may comprise a use of the at least one item by the user, an amount of use of the at least one item by the user, purchase needs of the user, purchase interests of the user, and purchase requests for the at least one item by the user. For example, the personality information may include at least one of shopping by the user, online search engine searches by the user, actions taken by the user, biometrics of the user, locations visited by the user, media consumed by the user, and social networking and microblogging posts by the user, and may be used to determine interests of the user. The personality information may be updated over time based on newly retrieved data by the personalized device system. The personality information may be weighed based on a timestamp of the data in the personality information.

A purchase prediction for at least one item by the user based on the personality information is determined, at step 404. In various embodiments, purchase information may be determined prior to the purchase predictions, wherein the purchase prediction is further determined using the purchase information. For example, the purchase information for the at least one item from a merchant that sells the at least one item may be accessed, wherein the purchase information comprises at least one of a sales price for the at least one item at the physical merchant location, an inventory level for the at least one item at the physical merchant location, and a discount for the at least one item at the physical merchant location.

The purchase information may also comprise a sale price of the at least one item, availability of the at least one item to the user, an available stock of the at least one item to the user, a discount of the at least one item, purchase schedule of the at least one item by the user, and available funds to the user. Thus, the purchase information may be determined by a sensor associated with a real world object. In such embodiments, the sensor is accessible over the Internet and embedded in a physical location or other real world object. The purchase information may therefore comprise a reorder amount for an inventory of stock level of the at least one item for the user.

At step 406, a merchant and a physical merchant location for the merchant that sells the at least one item is determined. Once determined, a purchase request for the at least one item from the merchant on behalf of the user is generated using the purchase prediction, at step 408. The purchase request is processed with the merchant using a payment provider system. In various embodiments, the personalized device system utilizes a payment account of the user to process the purchase request with the merchant using the online payment provider, at step 410.

At step 412, a process to retrieve the at least one item from the physical merchant location and deliver the at least one item to the user using a delivery device associated with personalized device system is executed. The at least one item may be delivered to user by the delivery device at a current location of the user, a home location for the user, a work location for the user, and a location specified by the user. The personalized device system may comprise the delivery device having the non-transitory memory and the one or more hardware processors residing within the delivery device, wherein the personalized device system further comprises a movement component of the delivery device for movement of the personalized device system, and wherein the personalized device system executes the process using the movement component. In such embodiments, the non-transitory memory may further comprise identification information for the user, wherein the identification information identifies the personalized device system as associated with the user when the personalized device system retrieves the at least one item on behalf of the user, and wherein the identification information is used to process the purchase request with the merchant when the personalized device system arrives at the merchant location.

In other embodiments, the delivery device is external from the personalized device system, wherein the executing the process to retrieve the at least one item from the physical merchant location and deliver the at least one item to the user using the delivery device comprises communicating a set of instructions to the delivery device, wherein the set of instructions comprises directions to the physical merchant location and for delivery of the at least one item to the user, and wherein the set of instructions further comprises identification information for one of the user and the purchase request processed by the online payment provider. However, in further embodiments, the personalized device system further comprise the delivery device as a standalone drone device, wherein the processing the purchase request with the merchant using the online payment provider occurs at the merchant location, and wherein the delivery device comprises a communication module configured to communicate with a merchant device at the merchant location for the processing the purchase request with the merchant and retrieval of the at least one item from the physical merchant location.

In various embodiments, the personalized device may further determine whether the merchant requires identification of the user during purchase of the at least one item to release the at least one item and provide the identification of the user on behalf of the user using the delivery device and during the executing the process. For example, the at least one item comprises one of a prescription, alcohol, and a restricted item requiring proof of age or personal identification, wherein the identification is used by the delivery device to prove the identification of the user receiving the at least one item from the delivery device. The identification may be provided by delivery device at the physical merchant location through one of a voice or audio playback of the user, a call or a message to the user while the delivery device is at the physical merchant location, a personalized identification of the user, a username and a password for an account of the user, a thumbprint of the user, a payment card of the user, and an identification card of the user. In order to provide the authentication, the identification stored to the non-transitory memory may be accessed, an encrypted token may be generated with identification, and the encrypted token may be communicated to the delivery device, wherein the delivery device provides the encrypted token at the physical merchant location.

Figure 5:
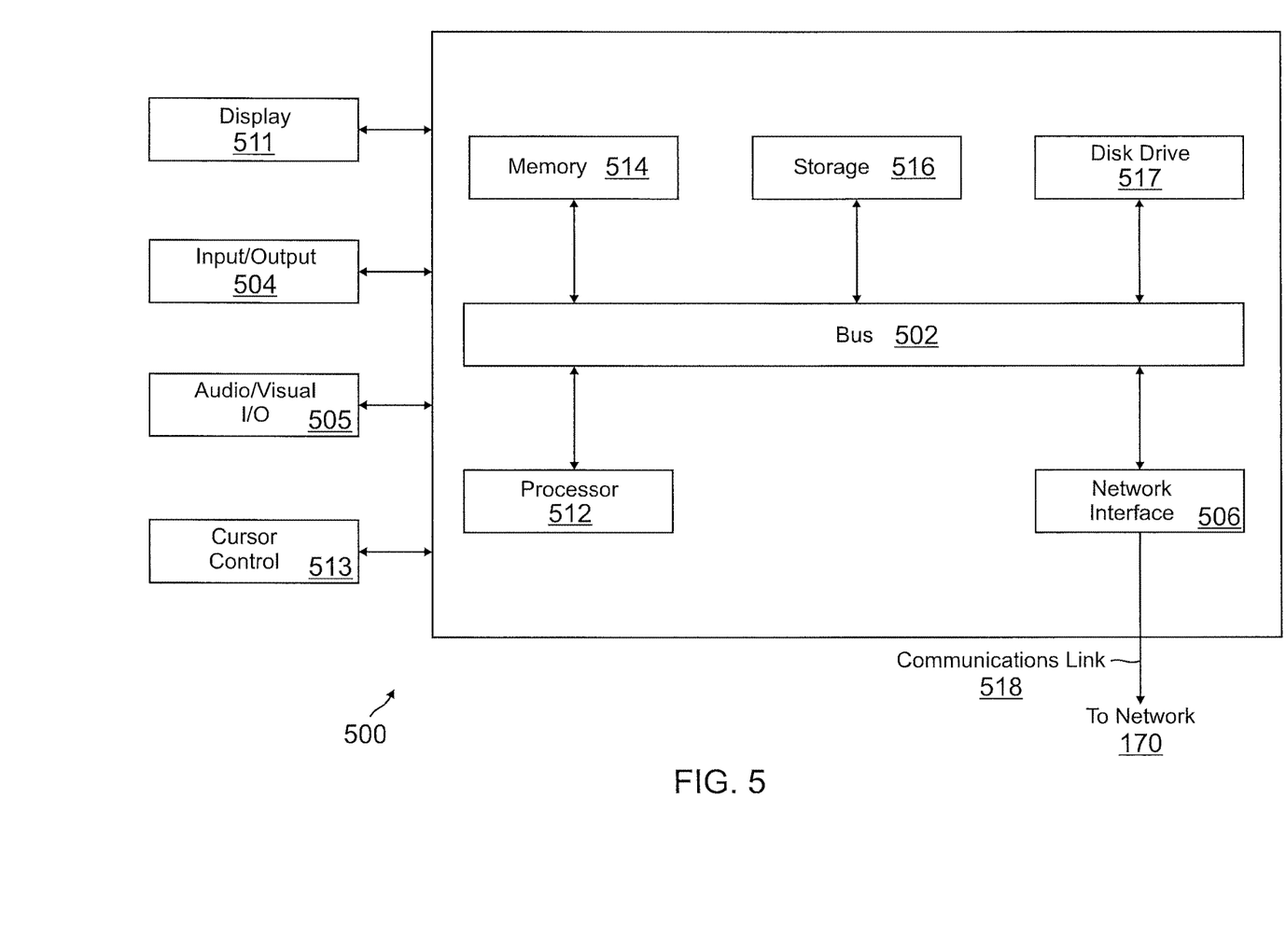
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A personalized device system, comprising:
   a non-transitory memory; and
   one or more hardware processors coupled to the non-transitory memory and configured to read instructions from the non-transitory memory to cause the personalized device system to perform operations comprising:
   accessing personality information for a user and purchase information associated with an item, wherein the purchase information is detected through a sensor corresponding to the item;
   determining a purchase prediction for the item by the user based on the personality information and the purchase information;
   determining a merchant and a physical merchant location for the merchant that sells the item;
   determining a purchase request for the item from the merchant on behalf of the user using the purchase prediction;
   processing the purchase request with the merchant using an online payment provider;
   detecting, through a mobile device associated with the user, a present location of the user;
   determining a destination location of the user at a future time based on a schedule of the user and the present location;
   generating a travel route from the physical merchant location for the merchant to the destination location at the future time; and
   executing a process to retrieve the item from the physical merchant location and deliver the item to the user using a delivery device associated with personalized device system, wherein the item is delivered to the user by the delivery device using the travel route.

2. The personalized device system of claim 1, wherein the personalized device system comprises the delivery device having the non-transitory memory and the one or more hardware processors residing within the delivery device, wherein the personalized device system further comprises a movement component of the delivery device for movement of the personalized device system, and wherein the personalized device system executes the process using the movement component.

3. The personalized device system of claim 2, wherein the non-transitory memory further comprises identification information for the user, wherein the identification information identifies the personalized device system as associated with the user when the personalized device system retrieves the item on behalf of the user, and wherein the identification information is used to process the purchase request with the merchant when the personalized device system arrives at the physical merchant location.

4. The personalized device system of claim 1, wherein delivery device is external from the personalized device system, and wherein the executing the process to retrieve the item from the physical merchant location and deliver the item to the user using the delivery device comprises:
   communicating a set of instructions comprising the travel route to the delivery device, wherein the set of instructions comprises identification information for one of the user and the purchase request processed by the online payment provider.

5. The personalized device system of claim 1, wherein the personalized device system further comprises the delivery device as a standalone drone device, and wherein the processing the purchase request with the merchant using the online payment provider occurs at the physical merchant location, and wherein the delivery device comprises a communication module configured to communicate with a merchant device at the physical merchant location for the processing the purchase request with the merchant and retrieval of the item from the physical merchant location.

6. The personalized device system of claim 1, wherein the personality information comprises one or more of a use of the item by the user, an amount of use of the item by the user, purchase needs of the user, purchase interests of the user, or purchase requests for the item by the user.

7. The personalized device system of claim 1, wherein purchase information comprises one or more of a sale price of the item, availability of the item to the user, an available stock of the item to the user, a discount of the item, purchase schedule of the item by the user, or available funds to the user.

8. The personalized device system of claim 1, wherein the operations further comprise:
   determining whether the merchant requires identification of the user during purchase of the item to release the item; and
   providing the identification of the user on behalf of the user using the delivery device and during the executing the process.

9. The personalized device system of claim 8, wherein the item comprises one of a prescription, alcohol, and a restricted item requiring proof of age or personal identification, and wherein the identification is used by the delivery device to prove the identification of the user receiving the item from the delivery device.

10. The personalized device system of claim 8, wherein the identification is provided by delivery device at the physical merchant location through one of a voice or audio playback of the user, a call or a message to the user while the delivery device is at the physical merchant location, a personalized identification of the user, a username and a password for an account of the user, a thumbprint of the user, a payment card of the user, and an identification card of the user.

11. The personalized device system of claim 8, wherein the operations further comprise:
- accessing the identification stored to the non transitory memory;
- generating an encrypted token using the identification; and
- communicating the encrypted token to the delivery device, wherein the delivery device provides the encrypted token at the physical merchant location.

12. The personalized device system of claim 1, wherein the destination location is further determined based on at least one of a home location for the user, a work location for the user, or a location specified by the user.

13. The personalized device system of claim 1, wherein the purchase information comprises a reorder amount for an inventory of stock level of the item for the user.

14. The personalized device system of claim 1, wherein the sensor is accessible over the Internet, and wherein the sensor is embedded in a physical location associated with the item.

15. A method comprising:
- accessing, by a personalized device system that comprises one or more hardware processors coupled to a non-transitory memory, personality information for a user;
- determining a purchase prediction for item by the user based on the personality information;
- determining a merchant and a physical merchant location for the merchant that sells the item;
- determining a purchase request for the item from the merchant on behalf of the user using the purchase prediction;
- processing the purchase request with the merchant using a payment provider system;
- detecting, through a mobile device associated with the user, a present location of the user;
- determining a destination location of the user at a future time based on a schedule of the user and the present location;
- generating a travel route from the physical merchant location for the merchant to the destination location at the future time; and
- executing a process to retrieve the item from the physical merchant location and deliver the item to the user using a delivery device associated with personalized device system, wherein the item is delivered to the user by the delivery device using the travel route.

16. The method of claim 15, wherein the personality information comprises at least one of shopping by the user, online search engine searches by the user, actions taken by the user, biometrics of the user, locations visited by the user, media consumed by the user, or social networking and microblogging posts by the user, and wherein the personality information is updated over time based on newly retrieved data by the personalized device system.

17. The method of claim 16, wherein the personality information is weighed based on a timestamp of the newly retrieved data in the personality information.

18. The method of claim 15, wherein prior to the determining the purchase prediction, further comprising:
- accessing purchase information for the item from a merchant that sells the item, wherein the purchase information comprises at least one of a sales price for the item at the physical merchant location, an inventory level for the item at the physical merchant location, and a discount for the item at the physical merchant location, and wherein the purchase prediction is further determined using the purchase information.

19. The method of claim 15, wherein the personalized device system utilizes a payment account of the user to process the purchase request with the merchant using the payment provider system.

20. A non-transitory machine-readable medium having stored thereon machine-readable instructions executable to cause a machine to perform operations comprising:
- accessing, by a personalized device system that comprises one or more hardware processors coupled to a non-transitory memory, personality information for a user and purchase information for item, wherein the purchase information is detected by at least one sensor corresponding to the item;
- determining a purchase predictions for the item by the user based on the personality information and the purchase information;
- determining a merchant and a physical merchant location for the merchant that sells the item;
- determining a purchase request for the item from the merchant on behalf of the user;
- processing the purchase request with the merchant using a payment provider system;
- detecting, through a mobile device associated with the user, a present location of the user;
- determining a destination location of the user at a future time based on a schedule of the user and the present location;
- generating a travel route from the physical merchant location for the merchant to the destination location at the future time; and
- executing a process to retrieve the item from the physical merchant location and deliver the item to the user using a delivery device associated with personalized device system, wherein the item is delivered to the user by the delivery device using the travel route.

* * * * *

UNITED STATES PATENT AND TRADEMARK OFFICE
CERTIFICATE OF CORRECTION

PATENT NO. : 10,229,448 B2
APPLICATION NO. : 14/971593
DATED : March 12, 2019
INVENTOR(S) : Sumeet Ahuja Page 1 of 1

It is certified that error appears in the above-identified patent and that said Letters Patent is hereby corrected as shown below:

In the Specification

In Column 13, Line 12 change "FITBIT@" to --FITBIT(R)--.

In the Claims

In Claim 11, Column 25, Lines 12 and 13 change "accessing the identification stored to the non transitory memory;" to --accessing the identification;--.

Signed and Sealed this
Eighteenth Day of June, 2019

Andrei Iancu
*Director of the United States Patent and Trademark Office*